(12) United States Patent
Mei et al.

(10) Patent No.: US 7,405,260 B2
(45) Date of Patent: Jul. 29, 2008

(54) METHOD FOR CONTROLLING THE POLYMER FLOW IN A POLYMERIZATION PROCESS

(75) Inventors: Gabriele Mei, Ferrara (IT); Stefano Bertolini, Ancona (IT)

(73) Assignee: Basell Poliolefine Italia s.r.l., Milan (IT)

( * ) Notice: Subject to any disclaimer, the term of this patent is extended or adjusted under 35 U.S.C. 154(b) by 169 days.

(21) Appl. No.: 10/589,591

(22) PCT Filed: Jan. 31, 2005

(86) PCT No.: PCT/EP2005/001000

§ 371 (c)(1), (2), (4) Date: Aug. 16, 2006

(87) PCT Pub. No.: WO2005/095465

PCT Pub. Date: Oct. 13, 2005

(65) Prior Publication Data

US 2008/0058484 A1     Mar. 6, 2008

Related U.S. Application Data

(60) Provisional application No. 60/551,179, filed on Mar. 8, 2004.

(30) Foreign Application Priority Data

Mar. 3, 2004     (EP) .................................. 04100856

(51) Int. Cl.
*C08F 2/34*     (2006.01)
*C08F 2/38*     (2006.01)

(52) U.S. Cl. ............................ 526/88; 526/65; 526/901; 526/905

(58) Field of Classification Search .................. 526/65, 526/88, 901, 905
See application file for complete search history.

(56) References Cited

U.S. PATENT DOCUMENTS 5,728,353 A * 3/1998 Govoni et al. ............... 422/145

FOREIGN PATENT DOCUMENTS

| EP | 728769 | 8/1996 |
|---|---|---|
| EP | 782587 | 7/1997 |
| EP | 1012195 | 6/2000 |
| WO | 2005/019280 | 3/2005 |

OTHER PUBLICATIONS

D. Geldart (Editor), "Chapter 7—High Velocity Fluidized Beds," *Gas Fluidization Technology*, John Wiley & Sons Ltd., p. 155-195 (1986).

* cited by examiner

*Primary Examiner*—Fred M Teskin
(74) *Attorney, Agent, or Firm*—William R. Reid

(57) ABSTRACT

A method for controlling the flowability of polymer particles flowing downward in a densified form inside a polymerization reactor, in which one or more monomers are gas-phase polymerized in the presence of a polymerization catalyst, the density of solid (Kg of polymer per $m^3$ of reactor occupied by the polymer) being higher than 80% of the "poured bulk density" of the polymer, the method being characterized in that a liquid stream is continuously fed into the polymerization reactor at a mass flow rate per unity of reactor surface higher than 30 Kg/h $m^2$.

10 Claims, 1 Drawing Sheet

METHOD FOR CONTROLLING THE POLYMER FLOW IN A POLYMERIZATION PROCESS

This application is the U.S. national phase of International Application PCT/EP2005/001000, filed Jan. 31, 2005, claiming priority to European Patent Application 04100856.6 filed Mar. 3, 2004, and the benefit under 35 U.S.C. 119(e) of U.S. Provisional Application No. 60/551,179, filed Mar. 8, 2004; the disclosures of International Application PCT/EP2005/001000, European Patent Application 04100856.6 and U.S. Provisional Application No. 60/551,179, each as filed, are incorporated herein by reference.

The present invention relates to a continuous process for the gas-phase polymerization of monomers, particularly of α-olefins, in the presence of a polymerization catalyst.

In particular, the present invention relates to a method for controlling the flowability of polymer particles flowing inside a gas-phase polymerization reactor.

The development of olefin polymerisation catalysts with high activity and selectivity, particularly of the Ziegler-Natta type and, more recently, of the metallocene type, has led to the widespread use on an industrial scale of processes in which the polymerisation of olefins is carried out in a gaseous medium in the presence of a solid catalyst.

A widely used technology for gas-phase polymerisation processes is the fluidised-bed technology. In fluidised-bed gas-phase processes, the polymer is confined in a vertical cylindrical zone (polymer bed). The reaction gases exiting the reactor are taken up by a compressor, cooled and sent back, together with make-up monomers and appropriate quantities of hydrogen, to the bottom of the polymer bed through a distribution plate. Entrainment of solid from the gas exiting the reactor is limited by an appropriate dimensioning of the upper part of the reactor (freeboard, i.e. the space between the upper bed surface and the gas exit point), where the gas velocity is reduced, and, in some designs, by the interposition of cyclones in the gases exit line. The flow rate of the circulating gaseous monomers is set so as to assure a velocity within an adequate range above the minimum fluidisation velocity and below the "transport velocity". The heat of reaction is removed exclusively by cooling the circulating gas. The composition of the gas-phase controls the composition of the polymer, while the reaction kinetics is controlled by the addition of inert gases. The reactor is operated at constant pressure, normally in the range 1-4 MPa.

A significant contribution to the reliability of the fluidised-bed reactor technology in the polymerisation of α-olefins was made by the introduction of suitably pre-treated spheroidal catalyst of controlled dimensions and by the use of propane as a diluent.

Since fluidised-bed reactors approximate very closely the ideal behaviour of a "continuous stirred-tank reactor" (CSTR), it is very difficult to obtain products which are a homogeneous mixture of different types of polymeric chains. In fact, the composition of the gaseous mixture that is in contact with the growing polymer particle is essentially the same for all the residence time of the particle in the reactor. As a consequence, one of the major limits of fluidised-bed processes is the difficulty of broadening the molecular weight distribution of the obtained polymers. The breadth of the molecular weight distribution has an influence both on the rheological behaviour of the polymer (and hence the processability of the melt) and on the final mechanical properties of the product, and is a characteristic which is particularly important for the (co)polymers of ethylene.

This problem has been addressed in EP 782 587. According to this patent, it is possible to broaden the molecular weight distribution of polymers without affecting their homogeneity by means of a gas-phase process performed in a loop reactor responding to particular criteria of design. The gas-phase polymerization according to EP 782 587 is carried out in two interconnected polymerization zones to which one or more monomers are fed in the presence of a catalyst under reaction conditions and from which the polymer produced is discharged. The process is characterized in that the growing polymer particles flow through the first of said polymerization zones under fast fluidization conditions, leave said first polymerization zone and enter the second polymerization zone, through which they flow in a densified form under the action of gravity, leave the second polymerisation zone and are reintroduced into the first polymerisation zone, thus establishing a circulation of polymer between the two polymerisation zones.

According to the teachings of EP 782 587, it is possible to broaden the molecular weight distribution of the polymers simply by properly balancing the gas-phase compositions and the residence times in the two polymerisation zones of the gas-phase loop reactor. This is due to the fact that, while the polymer moves forward in the second polymerisation zone flowing downward in a plug-flow mode, owing to the monomer consumption, it finds gas-phase compositions richer in molecular weight regulator. Consequently, the molecular weights of the forming polymer decrease along the axis of this polymerization zone.

Different from the fluidized bed reactor technology, wherein the polymer particles grow in a fluidization state and their mutual distance is such to prevent their agglomeration, the new gas-phase technology described in EP 782 587 has to cope with the occurrence of clogging of the gas-phase reactor. In fact, a relevant technical feature of this technology is given by the downward flow of polymer in a densified form along the second polymerization zone: high values of density of the solid are reached (density of the solid=kg of polymer per $m^3$ of reactor) in this portion of reactor.

The industrial feasibility of this technology, as well as of any gas-phase polymerization involving a packed flow of polymer, can be strongly hindered by the occurring of some drawbacks. In fact, the packed flow of densified polymer, unless adequately controlled, can lead to the shutdown of the polymerization reactor. The polymerization reaction is exothermic and the heat of polymerization has to be removed by limited amounts of gaseous monomers surrounding the polymer particles. Due to the friction of the wall, the polymer particles flowing close to the reactor wall are subjected to a remarkable slowdown: as a consequence, these particles take more time to cover the length of the second polymerization zone with respect to the particles flowing in the central area of the cross section. The existence of said velocity gradient along the cross section of the reactor may involve an undesirable heating of the polymer particles flowing close to the wall, so that their temperature may increase up to a value causing the softening of the polymer. Sticking problems are thus easily generated with the consequent formation of polymer lumps, which interfere with the regular flow of the polymer inside the reactor. Eventually, the polymerization zone can be completely clogged by the polymer lumps: this implies the shutdown of the plant in order to remove the polymer lumps.

As described in EP-B-1012195, it is possible to obtain, within the reactor, two polymerization zones at different compositions by feeding a gas or liquid mixture to the top of the second polymerization zone. Said mixture acts as a barrier to the gas coming from the first polymerization zone. The introduction of the gas and/or liquid mixture of different composition into the second polymerization zone is such to establish a net gas flow upward at the upper limit of this polymerization zone. The established flow of gas upward has the effect of preventing the gas mixture present in the first polymerization zone from entering the second polymerization zone. The embodiment disclosed in EP-B-1012195 is particularly useful to prepare bimodal homopolymers or copolymers. However, the disclosure of this patent does not provide any suggestion or teaching as regards the operating conditions to be satisfied in the second polymerization zone to avoid the above described formation of polymer lumps in said portion of reactor.

It would be highly desirable to improve the technical feasibility of any gas-phase polymerization process in which the reactor is operated with a plug-flow of densified polymer, with the aim of avoiding the tackiness of the polymer particles and thus the formation of polymer lumps clashing with a correct and stable working of an industrial polymerization plant.

It has now been found that the above drawbacks can be overcome by feeding a liquid stream into the gas-phase polymerization reactor according to suitable operative conditions.

Figure 1:
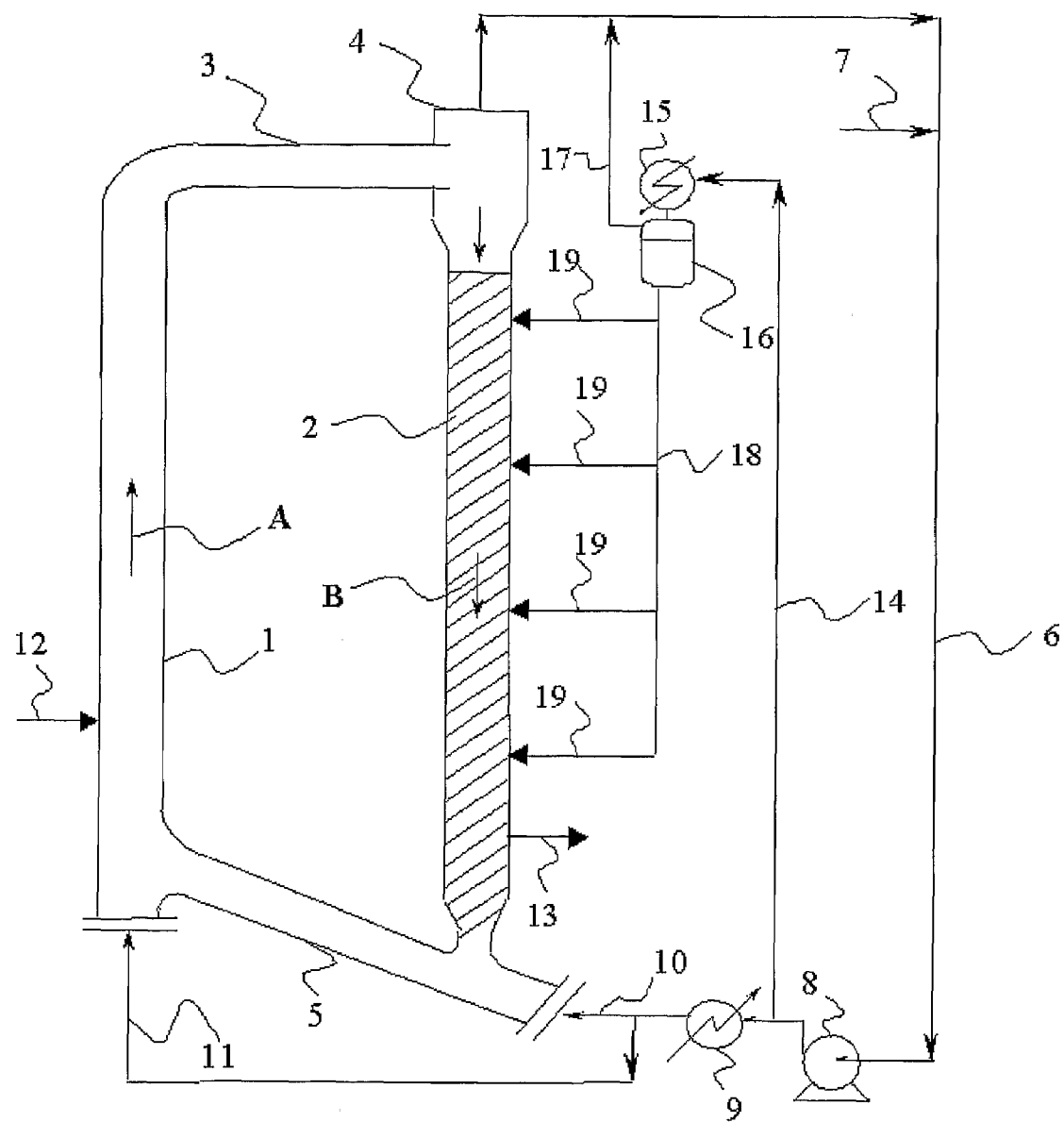
FIG. 1 illustrates a process flow diagram of a polymerization process.

Therefore, it is an object of the invention providing a method for controlling the flowability of polymer particles flowing downward in a densified form inside a polymerization reactor, in which one or more monomers are gas-phase polymerized in the presence of a polymerization catalyst, the density of solid (Kg of polymer per $m^3$ of reactor occupied by the polymer) being higher than 80% of the "poured bulk density" of the polymer, the method being characterized in that a liquid stream is continuously fed into the polymerization reactor at a mass flow rate per unity of reactor surface higher than 30 Kg/h $m^2$.

The "poured bulk density" of a polymer is a parameter well known to the person skilled in the art: it can be measured according to ASTM D1895/69.

The method of the present invention applies advantageously to all the gas-phase polymerization processes in which the growing polymer particles flow downward into the reactor in a densified form, so that high values of density of the solid inside the reactor are reached, these values approaching the bulk density of the polymer. Specifically, throughout the present specification a "densified form" of the polymer implies that the ratio between the mass of polymer particles and the reactor volume is higher than 80% of the "poured bulk density" of the obtained polymer. Thus, for instance, in case of a polymer bulk density equal to 420 Kg/$m^3$, "densified conditions" of the polymer flow are satisfied if the polymer mass/reactor volume ratio is higher than 336 kg/$m^3$.

In the particular case of gas-phase processes in which the growing polymer particles flow by gravity vertically down through the reactor in a plug flow (packed flow mode), the presence of limited amounts of gaseous monomer surrounding the polymer particles makes difficult to ensure a good flowability of the polymer particles. As said, the existence of a gradient of velocity along the cross section of the reactor reveals particularly detrimental to the correct working of the polymerization process itself.

By means of a massive introduction of liquid in proximity of the reactor walls, the method of the invention allows to attain the following advantages:

a) the fall by gravity of the liquid percolating onto the reactor walls originates a liquid layer interposed between the polymer particles and the reactor wall, thus reducing the friction of the polymer onto the wall. Furthermore, the percolating liquid provides the polymer particles with a downward thrust: by means of this action the existence of the above velocity gradient along the cross section of the reactor is partially counterbalanced. As a result, the flowability of the polymer particles close to the reactor wall is improved.

b) The partial evaporation of the liquid contributes to remove away the heat of polymerization, thus preventing an undesirable heating of the surface of the polymer particles and their mutual agglomeration: sticking problems inside the reactor are consequently minimized.

To this purpose, the liquid is advantageously introduced into the reactor under minimal pressure, so that preferably there is no liquid spray entering the downward polymer flow but, on the contrary, the formation of a thin film of liquid flowing downward onto the reactor walls.

According to an embodiment of the present invention, the liquid stream to be fed into the gas-phase polymerization reactor can be obtained from the condensation of fresh monomers: in this case, a part of the fresh monomers to be polymerized are directly fed into the reactor in a liquid form.

According to an alternative embodiment, the liquid stream to be fed into the polymerization reactor comes from the cooling and condensation of the recycle gas stream. When the polymerization of one or more monomers is carried out in a gas-phase process, the recycle gas stream is generally withdrawn from the upper zone of the reactor, cooled by passage through an external heat exchanger and then recycled to the reactor. Such a gas stream flows through the bed of growing polymer particles, thus removing away the heat of polymerization. The temperature of the recycle gas stream can be adjusted in the heat exchanger to maintain the reactor at the desired polymerization temperature. The recycle gas stream generally comprises, besides the gaseous monomers, also inert and diluent gases, such as propane, and chain transfer agents, such as hydrogen. As a consequence, the liquid stream fed into the reactor according to the invention can contain, besides the monomers to be polymerised, also condensable inert compounds used as a polymerization diluent: the preferred ones are aliphatic hydrocarbons $C_2$-$C_8$, such as propane, hexane.

Higher is the internal surface of the reactor, higher is the amount of liquid to be introduced to obtain an uniform flow of liquid film along the reactor wall: in fact, it is preferable to obtain a substantial, uninterrupted coverage of the internal wall by a liquid film flowing downward on the wall. It has been found (see the comparative example) that operating under a threshold value of liquid flow rate, the formation of polymer lumps cannot be avoided and the correct working of the reactor is seriously prejudiced. This threshold value corresponds to a liquid feeding of at least 30 Kg/h $m^2$ (mass flow rate per unity of reactor surface). A liquid flow rate per unity of reactor surface in the range from 50 to 200 Kg/h $m^2$ is preferred. Throughout the present specification with the term "reactor surface" is meant only the portion of internal surface of the reactor occupied by the polymer bed.

A substantially uniform distribution of the liquid film onto the reactor surface is achieved by placing along the axes of the reactor a sufficient number of feeding points. According to an embodiment, the feeding of the liquid stream is equally distributed into the reactor by means of more feeding lines, the number of said feeding lines being an integer equal or higher than 0.2×H, where H is the height (expressed in meters) of the polymer bed inside the reactor. For instance, for a height of polymer bed equal to 22 meters, the minimum number of feeding lines along the reactor axes is of 5. This embodiment allows the achievement of a substantially uniform distribution of the liquid onto the reactor surface, thus preventing the existence of zones not reached by the liquid film.

In particular, the method of the present invention can be advantageously applied to the gas-phase polymerization process disclosed in EP 782 587 and EP 1 012 195, where the polymerization of one or more olefins is carried out in two interconnected polymerization zones. In fact, as described in the above patents, the polymer particles flow downward in a "densified form" in one of said two interconnected polymerization zones.

Therefore, according to an embodiment of the present invention, the monomers to be polymerized are α-olefins of formula $CH_2=CHR$, where R is hydrogen or a hydrocarbon radical having 1-12 carbon atoms, and the gas-phase polymerization is carried out in a first and a second interconnected polymerization zones, where the growing polymer particles flow through the first of said polymerization zones under fast fluidization conditions, leave said first polymerization zone and enter the second of said polymerization zones through which they flow downward in a densified form, leave said second polymerization zone and are reintroduced into said first polymerization zone, thus establishing a circulation of polymer between said two polymerization zones.

In the first polymerization zone, hereinafter indicated as the "riser", fast fluidisation conditions are imposed: this means that the velocity of the fluidizing gas is higher than the transport velocity of the polymer particles, so that the solid is entrained by the fluidizing gas. The terms "transport velocity" and "fast fluidisation state" are well known in the art; for a definition thereof, see, for example, "D. Geldart, Gas Fluidisation Technology, page 155 et seq., J. Wiley & Sons Ltd., 1986".

In the second polymerization zone, hereinafter indicated as the "downcomer", the growing polymer particles flow downward in a densified form under the action of gravity. High values of density of the solid, which approach the bulk density of the polymer, are the relevant feature of the second polymerization zone. In this zone a positive gain in pressure can be obtained along the direction of flow, so that it becomes possible to reintroduce the polymer into the riser without the help of special mechanical means. In this way, a "loop" circulation is set up, which is defined by the balance of pressures between the two polymerisation zones and by the head losses introduced into the system.

The operating conditions established in the downcomer are particularly severe: the temperature is in the range from 50° C. to 120° C. and the pressure from 1.5 MPa to 6 Mpa. Moreover, in the downcomer the density of solid (Kg of polymer per $m^3$ of reactor occupied by the polymer) exceeds of the 80% the value of "poured bulk density" of the obtained polymer.

Due to this high concentration of polymer, little amounts of gas act as a cooling medium into the downcomer, where only a relatively low heat transfer coefficient is guaranteed. The temperature of the polymer increases as it descends in the second polymerization zone, so that in the bottom part thereof the situation is particularly critical. The motion of the polymer particles close to the wall is made slower by the friction exerted by the wall. The tackiness between adjacent polymer particles can lead to the formation of polymer lumps and the downcomer can be partially clogged by the growth of said polymer lumps with negative effects on the whole process.

The technical feasibility of the above gas-phase polymerization process can be greatly improved by adopting the method for controlling the flowability of polymer particles here claimed. Thus, according to the invention, a liquid stream is continuously fed into the second polymerization zone at a mass flow rate per unity of reactor surface higher than 30 Kg/h $m^2$, preferably in the range from 50 to 200 Kg/h $m^2$. This amount of liquid stream is introduced into the downcomer under minimal pressure, so that there is essentially no liquid spray, but the formation of a thin film of liquid flowing downward on the reactor walls is favored.

The liquid stream to be fed into the downcomer comes preferably from the cooling and condensation of the recycle gas stream. As a consequence, said liquid stream can contain, besides the monomers to be polymerised, also condensable inert compounds used as a polymerization diluent: the preferred ones are aliphatic hydrocarbons $C_2$-$C_8$.

A substantially uniform distribution of liquid film onto the reactor surface is achieved by placing along the axes of the downcomer a sufficient number of feeding points. According to a preferred embodiment, the feeding of liquid stream is equally distributed along the downcomer by means of more feeding lines, the number of said feeding lines being an integer equal or higher than 0.2×H, where H is the height (expressed in meters) of the polymer bed inside the second polymerization zone. A further improvement is achieved placing more feeding points in correspondence of the same cross section: this arrangement makes the liquid able to cover more uniformly the internal surface of the downcomer.

The method of the present invention will now be described in detail with reference to the enclosed figure, which has to be considered illustrative and not limitative of the scope of the invention.

FIG. 1 is a diagrammatic representation of the method of the present invention when applied to the polymerization process described in EP 782 587 and EP 1 012 195.

The polymerization reactor comprises a riser 1 wherein the polymer particles flow upward under fast fluidization conditions along the direction of the arrow A and a downcomer 2, wherein the polymer particles flow downward under the action of gravity along the direction of the arrow B. The two polymerization zones 1 and 2 are appropriately interconnected by the sections 3 and 5.

The catalyst components, preferably after a prepolymerization step, are continuously introduced via line 12 into the riser 1. The obtained polymer is continuously discharged from the reactor via line 13.

A gaseous mixture comprising one or more olefins, hydrogen and optionally an alkane as a diluent gas is fed to the reactor via one or more lines 7, suitably placed at any point of the gas recycle line 6 according to the knowledge of those skilled in art.

The growing polymer particles and the gaseous mixture leave the riser 1 and are conveyed to a solid/gas separation zone 4, from which the polymer particles enter the downcomer 2. A gaseous mixture is collected in the upper portion of said separation zone 4, before entering the gas recycle line 6. This gaseous mixture is compressed by means of the compression means 8 and then split in two gaseous streams. The first one is cooled by the cooling mean 9, and then fed to the connection zone 5 via line 10 and to the bottom of the riser 1 via line 11.

The other gaseous stream, obtained downstream the compression means 8, is fed via line 14 to the condenser 15, where it is cooled to a temperature at which the monomers and optional condensable inert gases are partially condensed. A separating vessel 16 is placed downstream the condenser 15. The separated gaseous mixture, enriched in hydrogen, is send via line 17 to the recycle line 6. On the contrary, the liquid obtained from the condensation step is passed to line 18 before to be fed to the downcomer 2. This amount of liquid is equally distributed into the downcomer 2 by means of more feeding lines 19 placed along the height of the downcomer 2 at the same mutual distance, so as to obtain a substantially uniform distribution of liquid film onto the internal surface of the downcomer. More feeding points can be arranged in correspondence of a same cross section to favor an uniform distribution of the liquid on the internal surface of the downcomer.

The method of the invention for controlling the flowability of polymer particles applied to the polymerization process described in FIG. 1 allows the preparation of a large number of olefin polymers without incurring in the clogging of the downcomer 2. Examples of polymers that can be obtained are:

high-density polyethylenes (HDPEs having relative densities higher than 0.940) including ethylene homopolymers and ethylene copolymers with α-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more α-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight; isotactic polypropylene and crystalline copolymers of propylene and ethylene and/or other α-olefins having a content of units derived from propylene of more than 85% by weight; isotactic copolymers of propylene and α-olefins, such as 1-butene, with an α-olefin content of up to 30% by weight;

impact-resistant propylene polymers obtained by sequential polymerisation of propylene and mixtures of propylene with ethylene containing up to 30% by weight of ethylene;

atactic polypropylene and amorphous copolymers of propylene and ethylene and/or other α-olefins containing more than 70% by weight of units derived from propylene; polybutadiene and other polydiene rubbers.

The above gas-phase polymerisation process can be carried out in the presence of a highly active catalyst system of the Ziegler-Natta or metallocene type.

A Ziegler-Natta catalyst system comprises the catalysts obtained by the reaction of a transition metal compound of groups 4 to 10 of the Periodic Table of Elements (new notation) with an organometallic compound of group 1, 2, or 13 of the Periodic Table of element.

In particular, the transition metal compound can be selected among compounds of Ti, V, Zr, Cr, and Hf. Preferred compounds are those of formula $Ti(OR)_nX_{y-n}$ in which n is comprised between 0 and y; y is the valence of titanium; X is halogen and R is a hydrocarbon group having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$.

Preferred organometallic compounds are the organo-Al compounds and in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

Particularly suitable high yield ZN catalysts are those wherein the titanium compound is supported on magnesium halide in active form which is preferably $MgCl_2$ in active form. As internal electron donor compounds can be selected among esters, ethers, amines, and ketones. In particular, the use of compounds belonging to 1,3-diethers, phthalates, benzoates and succinates is preferred.

Further improvements can be obtained by using, in addition to the electron-donor present in the solid component, an electron-donor (external) added to the aluminium alkyl co-catalyst component or to the polymerization reactor. These external electron donor can be the same as, or different from, the internal donor. Preferably they are selected from alkoxysilanes of formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

The above cited catalysts show, in addition to a high polymerization activity, also good morphological properties that make them particularly suitable for the use in the gas-phase polymerization process of the invention.

Also metallocene-based catalyst systems can be used in the process of the present invention and they comprise:

at least a transition metal compound containing at least one π bond;

at least an alumoxane or a compound able to form an alkylmetallocene cation; and optionally an organo-aluminum compound.

A preferred class of metal compound containing at least one π bond are metallocene compounds belonging to the following formula (I):

$$Cp(L)_qAMX_p \qquad (I)$$

wherein

M is a transition metal belonging to group 4, 5 or to the lanthanide or actinide groups of the Periodic Table of the Elements; preferably M is zirconium, titanium or hafnium;

the substituents X, equal to or different from each other, are monoanionic sigma ligands selected from the group consisting of hydrogen, halogen, $R^6$, $OR^6$, $OCOR^6$, $SR^6$, $NR^6_2$ and $PR^6_2$, wherein $R^6$ is a hydrocarbon radical containing from 1 to 40 carbon atoms;

preferably, the substituents X are selected from the group consisting of —Cl, —Br, -Me, -Et, -n-Bu, -sec-Bu, -Ph, -Bz, '$CH_2SiMe_3$, —OEt, —OPr, —OBu, —OBz and —$NMe_2$;

p is an integer equal to the oxidation state of the metal M minus 2;

n is 0 or 1; when n is 0 the bridge L is not present;

L is a divalent hydrocarbon moiety containing from 1 to 40 carbon atoms, optionally containing up to 5 silicon atoms, bridging Cp and A, preferably L is a divalent group $(ZR^7{}_2)_n$;

Z being C, Si, and the $R^7$ groups, equal to or different from each other, being hydrogen or a hydrocarbon radical containing from 1 to 40 carbon atoms;

more preferably L is selected from $Si(CH_3)_2$, $SiPh_2$, SiPhMe, $SiMe(SiMe_3)$, $CH_2$, $(CH_2)_2$, $(CH_2)_3$ or $C(CH_3)_2$;

Cp is a substituted or unsubstituted cyclopentadienyl group, optionally condensed to one or more substituted or unsubstituted, saturated, unsaturated or aromatic rings;

A has the same meaning of Cp or it is a $NR^7$, —O, S, moiety wherein $R^7$ is a hydrocarbon radical containing from 1 to 40 carbon atoms;

Alumoxanes used as component b) are considered to be linear, branched or cyclic compounds containing at least one group of the type:

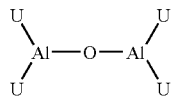

wherein the substituents U, same or different, are defined above.

In particular, alumoxanes of the formula:

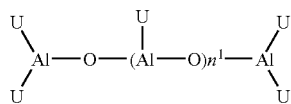

can be used in the case of linear compounds, wherein $n^1$ is 0 or an integer of from 1 to 40 and where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number; or alumoxanes of the formula:

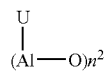

can be used in the case of cyclic compounds, wherein $n^2$ is an integer from 2 to 40 and the U substituents are defined as above.

The following examples will further illustrate the present invention without limiting its scope.

EXAMPLES

General Polymerization Conditions

The polymerization is carried out in continuous in a plant comprising a precontacting section, where the various catalyst components are premixed, a prepolymerization section, and a gas-phase polymerization section carried out in a reactor of the type described in FIG. 1.

A Ziegler-Natta catalyst is used as the polymerization catalyst, comprising:

a titanium solid catalyst component prepared with the procedure described in EP 728 769, Example 5, lines 46 to 53;

triethylaluminium (TEAL) as a cocatalyst;

dicyclopentyldimethoxysilane as an external donor.

The molar ratio Al/Ti is 68, while the weight ratio TEAL/external donor is 4.

The above catalyst components are precontacted at 15° C. for 10 minutes in a precontacting vessel.

The activated catalyst is fed to the prepolymerization section where propylene is polymerized in bulk. The propylene feed and the residence time are adjusted so as to obtain the desired prepolymerization yields, in terms of g of prepolymer per g of solid catalyst component.

After the prepolymerization, the catalyst is continuously introduced via line 12 into the gas-phase polymerisation reactor shown in FIG. 1. The reactor comprises two polymerization zones having a cylindrical shape: the riser 1 (height 35 m, diameter 1.8 m) and the downcomer 2 (height 20 m; diameter 1.1 m), interconnected by the sections 3 and 5.

Example 1

Polypropylene is prepared by polymerizing propylene in the presence of hydrogen as a molecular weight regulator and propane as an inert diluent. In both the riser 1 and downcomer 2 the following operative conditions are satisfied:

| | |
|---|---|
| Temperature (° C.) | 80 |
| Pressure (barg) | 28 |
| Propylene (% mol) | 90 |
| Propane (% mol) | 9 |
| Hydrogen (% mol) | 1 |

About 1000 ton/h of a gaseous stream containing propylene, propane and hydrogen flow upwards along the riser 1, where fast fluidization conditions are established: the polymerisation takes place forming polypropylene particles, which are conveyed through the section 3 to the separation zone 4. From this zone 4 the polymer is mostly separated from the gas and enters the downcomer 2. Only about 50 ton/h of gas are entrapped with the descending flow of polymer in the downcomer 2: therefore, a gas stream in an amount of about 950 ton/h is conveyed to the recycle line 6.

The density of solid (Kg of polymer per $m^3$ of reactor occupied by the polymer) inside the downcomer 2 is measured in order to evaluate if the polymer particles flow downward in a "densified" form along the downer 2: the measurement gives a value of about 420 Kg/$m^3$. At the same time, the poured bulk density of the obtained polypropylene particles is measured according to ASTM D1895/69 giving a value of 450 Kg/$m^3$l. Thus, being the density of solid higher than 80% of the "poured bulk density", the polypropylene particles flow downward into the downer 2 according to "densified" conditions.

The method of the present invention is here applied to ensure a good flowability of the growing polymer into the dowcomer 2. A fraction of the recycle stream, in an amount of about 10 ton/h, is passed to line 14 and partially condensed in the condenser 15 at the operating conditions of 45° C. and 29 bar.

6 ton/h of a liquid stream containing propylene and propane are withdrawn from the bottom of the vessel 16 and continuously fed to the downcomer 2 by means of four feeding lines 19, said feeding lines 19 being placed at a mutual distance of about 5 m along the height of the downcomer.

Taking into account that the internal surface of the downcomer 2 is of about 69 m$^2$, said liquid stream is continuously fed into the polymerization reactor at a mass flow rate per unity of reactor surface of about 87 Kg/h m$^2$.

As a result, the feeding of the above liquid stream allows a continuous discharge of polypropylene from the reactor, preventing any formation of polymer lumps into the downcomer 2: about 20 ton/h of polypropylene are continuously discharged from the downcomer 2 via line 13.

Example 2

A propylene/ethylene copolymer is prepared by copolymerizing propylene and ethylene in the presence of hydrogen as a molecular weight regulator and propane as an inert diluent. In both the riser 1 and downcomer 2 the following operative conditions are satisfied:

| | |
|---|---|
| Temperature (° C.) | 72 |
| Pressure (barg) | 26 |
| Propylene (% mol) | 88.5 |
| Ethylene (% mol) | 2.5 |
| Propane (% mol) | 8.0 |
| Hydrogen (% mol) | 1.0 |

About 1000 ton/h of a gaseous stream containing propylene, ethylene, propane and hydrogen flow upwards along the riser 1. The polymerisation takes place forming particles of a propylene/ethylene copolymer, which are conveyed through the section 3 to the separation zone 4. From this zone 4 the polymer is mostly separated from the gas and enters the downcomer 2: only about 50 ton/h of gas are entrapped with the descending flow of polymer in the downcomer 2, so that gas stream in an amount of about 950 ton/h is conveyed to the recycle line 6.

The density of solid (Kg of polymer per m$^3$ of reactor occupied by the polymer) inside the downcomer 2 is measured giving a value of about 410 Kg/M$^3$.

The poured bulk density of the obtained copolymer is of 452 Kg/M$^3$. Thus, being the density of solid higher than 80% of the "poured bulk density", the polypropylene particles flow downward into the downer 2 in "densified" conditions.

A fraction of the recycle stream, in an amount of about 20 ton/h, is passed to line 14 and partially condensed in the condenser 15, at the operating conditions of 40° C. and 27 bar. 8 ton/h of a liquid stream containing propylene, propane and traces of ethylene are withdrawn from the bottom of the vessel 15 and continuously fed to the downcomer 2 by means of four feeding lines 19, said feeding lines 19 being placed at a mutual distance of about 5 m along the height of the downcomer.

Taking into account that the internal surface of the downcomer 2 is of about 69 m$^2$, said liquid stream is continuously fed into the polymerization reactor at a mass flow rate per unity of reactor surface of about 116 Kg/h m$^2$.

As a result, the feeding of the above liquid stream allows a continuous discharge of polymer from the reactor, preventing any formation of polymer lumps into the downcomer 2: about 20 ton/h of propylene/ethylene copolymer are continuously discharged from the downcomer 2 via line 13.

Comparative Example A

The polymerization of propylene was repeated according to the same operating conditions of Example 1, with the difference that the recycle gas stream is not fed to line 14 and to the condenser 15: as a consequence, no liquid stream is fed to the downcomer 2.

After a time of 24 hours, the discharge of polypropylene from the reactor via line 13 is interrupted due the formation of polymer lumps into the downcomer 2: the polymer lumps hinder the regular flow of polymer particles into the downcomer 2 till to cause a complete clogging of the reactor.

Comparative Example B

The polymerization of propylene was repeated according to the same operating conditions of Example 1, with the difference that a lower amount of the recycle gas stream, of about 2 ton/h, is passed to line 14 and partially condensed in the condenser 15, at the operating conditions of 45° C. and 29 bar.

1 ton/h of a liquid stream containing propylene and propane is withdrawn from the bottom of the vessel 16 and is continuously fed to the downcomer 2 by means of four feeding lines 19, said feeding lines 19 being placed at a mutual distance of about 5 m along the height of the downcomer 2.

Taking into account that the internal surface of the downcomer 2 is of about 69 m$^2$, said liquid stream is continuously fed into the downcomer at a mass flow rate per unity of surface of about 14.5 Kg/h m$^2$ After a time of 36 hours, the discharge of polypropylene from the reactor via line 13 is interrupted due the formation of polymer lumps into the downcomer 2: the polymer lumps hinder the regular flow of polymer particles into the downcomer 2 till to cause a complete clogging of the reactor.

The invention claimed is:

1. A method for controlling the flowability of polymer particles comprising:
    feeding a liquid stream continuously into a polymerization reactor comprising a polymer bed at a mass flow rate per unity of reactor surface higher than 30 Kg/h-m$^2$,
        wherein the polymer particles comprise a polymer and a density of solid higher than 80% of a poured bulk density of the polymer, where the density of solid is the Kg of polymer per m$^3$ of reactor occupied by the polymer, and the polymer particles flow downward in a densified form inside the polymerization reactor, wherein at least one monomer is gas phase polymerized in the presence of a polymerization catalyst, the monomer comprising fresh monomers.

2. The method according to claim 1, wherein said liquid stream is fed at a mass flow rate per unity of reactor surface in the range from 50 to 200 Kg/h m$^2$.

3. The method according to claim 1, wherein said liquid stream is obtained from the condensation of a part of the fresh monomers.

4. The method according to claim 1, wherein said liquid stream is obtained from cooling and condensation of a recycle gas stream.

5. The method according to claim 4, wherein said liquid stream comprises the at least one monomer and condensable inert compounds selected from aliphatic hydrocarbons $C_2$-$C_8$.

6. The method according to claim 1, wherein the feeding of said liquid stream is equally distributed along the reactor by at least one feeding line, the number of said feeding lines being an integer at least equal to 0.2×H, where H is the height in meters of the polymer bed.

7. The method according to claim 1, wherein said at least one monomer is an α-olefin of formula $CH_2=CHR$, where R is hydrogen or a hydrocarbon radical having 1-12 carbon atoms.

8. The method according to claim 7, wherein said α-olefins are gas-phase polymerized in a first polymerization zone and a second polymerization zone comprising a polymer bed, the first and second polymerization zones being interconnected, where the polymer particles flow through the first polymerization zone under fast fluidization conditions, leave said first polymerization zone and enter the second polymerization zone through which they flow downward in a densified form, leave said second polymerization zone and are reintroduced into said first polymerization zone, thus establishing a circulation of polymer between said two polymerization zones.

9. The method according to claim 8, wherein said liquid stream is continuously fed into said second polymerization zone.

10. The method according to claim 9, wherein the feeding of said liquid stream is equally distributed along the height of said second polymerization zone by at least one feeding line, the number of said feeding lines being an integer at least equal to 0.2×H, where H is the height in meters of the second polymerization zone polymer bed.

* * * * *